(12) United States Patent
Ghosh

(10) Patent No.: US 11,871,049 B2
(45) Date of Patent: Jan. 9, 2024

(54) METHOD OF IDENTIFYING AN ABRIDGED VERSION OF A VIDEO

(71) Applicant: Microsoft Technology Licensing, LLC, Redmond, WA (US)

(72) Inventor: Kushal Ghosh, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/791,489

(22) PCT Filed: Nov. 20, 2020

(86) PCT No.: PCT/US2020/061401
§ 371 (c)(1),
(2) Date: Jul. 7, 2022

(87) PCT Pub. No.: WO2021/141686
PCT Pub. Date: Jul. 15, 2021

(65) Prior Publication Data
US 2023/0044011 A1  Feb. 9, 2023

(30) Foreign Application Priority Data
Jan. 7, 2020 (EP) ..................................... 20150586

(51) Int. Cl.
*H04N 21/44* (2011.01)
*H04N 21/234* (2011.01)
(Continued)

(52) U.S. Cl.
CPC ....... *H04N 21/23418* (2013.01); *G06F 16/71* (2019.01); *G06F 16/75* (2019.01);
(Continued)

(58) Field of Classification Search
None
See application file for complete search history.

(56) References Cited

U.S. PATENT DOCUMENTS 8,671,109 B2  3/2014  Gupta et al.
9,087,125 B2  7/2015  Berg et al.
(Continued)

OTHER PUBLICATIONS

"European Extended Search Report Issued in European Patent Application No. 20150586.4", dated Jul. 20, 2020, 7 Pages.
(Continued)

*Primary Examiner* — Cai Y Chen
(74) *Attorney, Agent, or Firm* — RAY QUINNEY & NEBEKER P.C; James Bullough

(57) ABSTRACT

A computer-implemented method of identifying whether a target video comprises an abridged version of a reference video includes evaluating condition a) that the target video does not comprise all shots of the reference video; condition b) that the target video includes groups of consecutive shots also included in the reference video; and condition c) that all shots which are present in both the target video and the reference video are in the same order. The method further includes identifying whether the target video comprises an abridged version of the reference video; and outputting a result of the identifying. The target video is identified as comprising an abridged version of the reference video on condition that conditions a), b) and c) are met. Also provided is a data processing apparatus for performing the method; and a computer program and computer readable storage medium comprising instructions to perform the method.

20 Claims, 4 Drawing Sheets

(51) Int. Cl.
*G06F 16/71* (2019.01)
*G06F 16/75* (2019.01)
*G06F 16/78* (2019.01)
*G06V 20/40* (2022.01)
*H04N 21/442* (2011.01)
*H04N 21/845* (2011.01)

(52) U.S. Cl.
CPC .......... *G06F 16/7867* (2019.01); *G06V 20/48* (2022.01); *G06V 20/49* (2022.01); *H04N 21/44236* (2013.01); *H04N 21/8456* (2013.01)

(56) References Cited

U.S. PATENT DOCUMENTS

| | | | |
|---|---|---|---|
| 2010/0188580 | A1 | 7/2010 | Paschalakis et al. |
| 2010/0260466 | A1* | 10/2010 | Shima .................... H04N 5/147 386/278 |
| 2011/0222787 | A1 | 9/2011 | Thiemert et al. |
| 2012/0087583 | A1* | 4/2012 | Yang .................... G06F 16/7847 382/218 |
| 2018/0137367 | A1 | 5/2018 | Pavetic |

OTHER PUBLICATIONS

"Office Action Issued in European Patent Application No. 20150586. 4", dated May 19, 2021, 6 Pages.

Anju, et al., "Video Copy Detection Using F-Sift and Graph Based Video Sequence Matching", In International Journal of Computer Science and Information Technologies, vol. 6, Issue 1, 2015, pp. 152-158.

Gesenhues, Amy, "YouTube's Copyright Match Tool finds Videos Uploaded without the Creator's Permission", Retrieved From: https://marketingland.com/youtubes-copyright-match-tool-finds-videos-uploaded-without-the-creators-permission-244166, Jul. 12, 2018, 6 Pages.

Hoi, et al., "Similarity Measurement and Detection of Video Sequences", Submitted to Department of Computer Science and Engineering of Chinese University, Apr. 2003, 34 Pages.

Lee, et al., "Scenario based Dynamic Video Abstractions using Graph Matching", In Proceedings of the 13th Annual ACM International Conference on Multimedia, Nov. 6, 2005, 10 Pages.

Seok-Min, "Bimodal Fusion of Low-Level Visual Features and High-Level Semantic Features for Near-Duplicate Video Clip Detection", In Journal of Signal Processing: Image Communication, vol. 26, Issue 10, Nov. 1, 2011, pp. 612-627.

"International Search Report and Written Opinion issued in PCT Application No. PCT/US20/061401", dated Mar. 24, 2021, 12 Pages.

Zhou, et al., "Automatic Identification of Digital Video Based on Shot-Level Sequence Matching", In Proceedings of the 13th Annual ACM International Conference on Multimedia, Nov. 6, 2005, pp. 515-518.

* cited by examiner

METHOD OF IDENTIFYING AN ABRIDGED VERSION OF A VIDEO

BACKGROUND

Content creators, such as broadcasting companies, may need to detect copied video content as a part of their workflow. The detection of copied video content is also relevant for uncovering unauthorised copying of video content, e.g. the unauthorised uploading of content to Internet media platforms.

A video may be divided into a plurality of shots, separated by cuts, where each shot comprises a series of frames. Shot detection is a process for automatically partitioning videos into shots. Various algorithms for shot detection are known in the art.

SUMMARY

It is difficult to identify copied content when the videos to be compared are of different length, for example a cricket match and its highlights; a movie and its trailer; or an episode of a series and its recap.

Provided herein is a computer-implemented method of identifying whether a target video comprises an abridged version of a reference video, each of the target and reference videos being divided into a sequence of shots, wherein the method comprises:
  evaluating a condition a) that the target video does not comprise all shots of the reference video;
  evaluating a condition b) that the target video includes groups of consecutive shots also included in the reference video, wherein the groups include at least a threshold number of consecutive shots; and
  evaluating a condition c) that all shots which are present in both the target video and the reference video are in the same order in the target video and the reference video;
  identifying whether the target video comprises an abridged version of the reference video, wherein the identifying comprises identifying the target video as comprising an abridged version of the reference video on condition that the condition a), the condition b) and the condition c) are met; and
  outputting a result of the identifying.

The conditions a), b) and c) may allow for the reliable identification of abridged versions of reference videos by a computer. The result output by the method may be useful in the contexts of video production, video search, or detection of piracy, for example.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

As used herein, the verb 'to comprise' is used as shorthand for 'to include or to consist of'. In other words, although the verb 'to comprise' is intended to be an open term, the replacement of this term with the closed term 'to consist of' is explicitly contemplated.

As an example, an "abridged version of a reference video" in the context of the present disclosure refers to a video which comprises some, but not all, of the shots of a reference video. An abridged video may consist of shots from a reference video. Alternatively, an abridged video may include further content in addition to shots from a reference video. Typically, an abridged version of a reference video is not merely a truncated version of the reference video. In other words, one or more intermediate shots of the reference video are typically omitted from an abridged version of the reference video. The methods provided herein evaluate a set of conditions to determine whether or not a target video is an abridged version of a reference video.

Figure 1A:
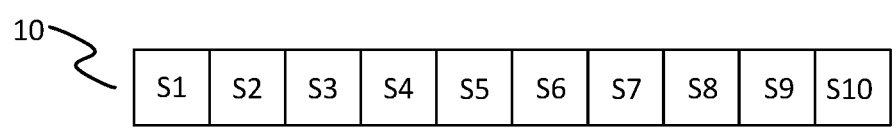
FIGS. 1a to 1c are schematic illustrations of: shots in a reference video, shots in a first target video consisting of an abridged version of the reference video, and shots in a second target video comprising an abridged version of the reference video and additional content, respectively.

FIG. 1a shows a schematic illustration of a reference video 10. The reference video 10 is made up of a series of shots S1, S2 ... S10 in chronological order from left to right. A skilled artisan will be familiar with the concept of a shot.

A shot is an uninterrupted set of frames. Adjacent shots are separated from one another by cuts, which are abrupt transitions in the video content. In the simple example of a two-dimensional live-action video, a shot is a portion of the video consisting of a continuous set of frames captured by a single camera.

Different shots may have different lengths. The length of a shot may be measured in terms of the number of frames present in the shot, or the playback time of the shot. Video playback may be at a fixed framerate. The measure of shot length used for a particular application may be selected as desired.

Lengths of shots vary depending on the nature of the content of the video, and may vary within a given video.

Figure 1B:
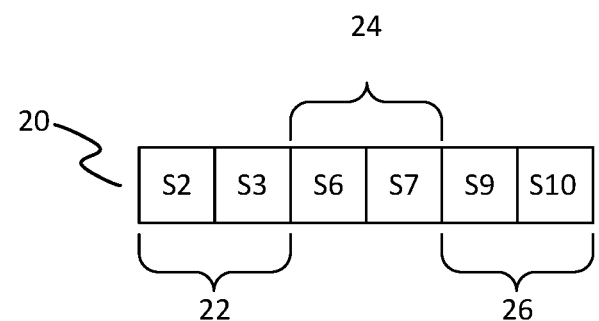

FIG. 1b shows a schematic illustration of a first example of a target video 20. Target video 20 consists of an abridged version of reference video 10.

The target video 20 consists of shots S2, S3, S6, S7, S9, S10. All of these shots are also present in reference video 10. The target video 20 does not, however, include every shot of reference video 10.

Shots S2, S3, S6, S7, S9, S10 appear in the same chronological order in target video 20 and reference video 10. The target video 20 omits some of the shots of reference video 10, but the order or sequence of the shots which are present is unchanged. Put differently, the target video 20 differs from reference video 10 only in that some shots of reference video 10 are not present in target video 20.

FIG. 1b further illustrates the concept of groups of consecutive shots. Three groups 22, 24, 26 are illustrated.

A group of consecutive shots is an uninterrupted set of shots from the reference video. In the present example, the groups {S2, S3}, {S6, S7}, and {S9, S10} are considered groups of consecutive shots.

In contrast, the grouping {S3, S6} is not a group of consecutive shots, because shots S3 and S6 are not consecutive in the reference video. Shots S4 and S5 are present between shots S3 and S6 in the reference video, but these are absent from the target video. For analogous reasons, the groupings {S2, S3, S6}, {S7, S9}, {S6, S7, S9} are not considered groups of consecutive shots.

Figure 1C:
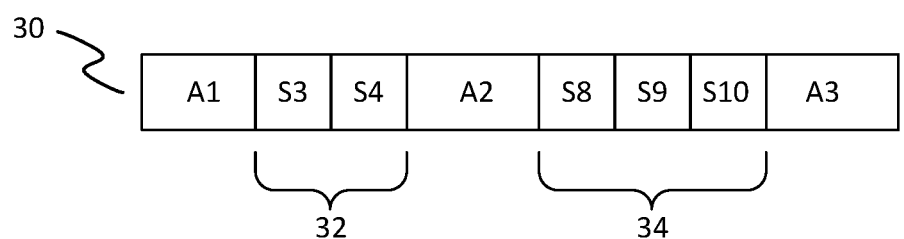

FIG. 1c shows a schematic illustration of a second example of a target video 30.

The target video 30 is an example of a video which includes, but does not consist of, an abridged version of the reference video 10.

The target video 30 includes two groups 32, 34 of consecutive shots from the reference video 10: {S3, S4} and {S8, S9, S10}. The first group {S3, S4} appears before the second group {S8, S9, S10} in both the reference video 10 and the target video 30. Thus, the groups of consecutive shots are in the same order in the target video and the reference video.

The target video 30 includes additional shot A1 before the first group 32 of consecutive shots from the reference video; additional shot A2 between the first and second groups 32, 34; and additional shot A3 after the second group 34. Additional shots A1, A2 and A3 are not present in the reference video, and thus target video 30 does not consist of an abridged version of the reference video 10.

An example data processing apparatus 200 will now be described with reference to FIG. 2, which shows a schematic block diagram of the apparatus.

The apparatus 200 includes a processing apparatus 210 which is operably linked to data storage 220 and an optional user terminal 230. The data storage 220 stores a computer program 240 for execution by the processing apparatus 210.

The user terminal 230 may include user input equipment and a display device.

The user input equipment may comprise any one or more suitable input devices for known in the art for receiving inputs from a user. Examples of input devices include a pointing device, such as a mouse, stylus, touchscreen, trackpad and/or trackball. Other examples of input devices include a keyboard, a microphone when used with voice recognition algorithm, and/or a video camera when used with a gesture recognition algorithm.

Where reference is made herein to receiving an input from the user through the user input equipment, this may mean through any one or more user input devices making up the user input equipment.

The user input equipment may be useful for allowing a user to identify a reference video and/or a target video to be evaluated by the method of the present disclosure. User input equipment may be omitted when the reference video and target video are identified in some other way, for example, programmatically or in response to a message received over a network.

The display device may take any suitable form for outputting images, such as a light emitting diode (LED) screen, liquid crystal display (LCD), plasma screen, or cathode ray tube (CRT). The display device may comprise a touchscreen, and thus also form at least part of the user input equipment. A touchscreen may enable inputs by via being touched by the user's finger and/or using a stylus.

The inclusion of a display device is optional. A display device is useful in examples where it is desired to display a graph, or other human readable output, to a user.

The processing apparatus 210 includes one or more processing units implemented in one or more dies, IC (integrated circuit) packages and/or housings at one or more geographic sites.

Each of the one or more processing units may take any suitable form known in the art, e.g. a general-purpose central processing unit (CPU), or a dedicated form of co-processor or accelerator processor such as a graphics processing unit (GPU), digital signal processor (DSP), etc. Each of the one or more processing units may comprise one or more cores.

Where it is said that a computer program is executed on the processing apparatus, this may mean execution by any one or more processing units making up the processing apparatus 210.

The processing apparatus 210 typically further comprises working memory, such as random-access memory and/or one or more memory caches within the one or more processing units.

The data storage 220 comprises one or more memory units implemented in one or more memory media in one or more housings at one or more geographic sites.

Each of the one or more memory units may employ any suitable storage medium known in the art, e.g. a magnetic storage medium such as a hard disk drive, magnetic tape drive etc.; or an electronic storage medium such as a solid state drive (SSD), flash memory or electrically erasable programmable read-only memory (EEPROM), etc.; or an optical storage medium such as an optical disk drive or glass or memory crystal based storage, etc.

Where it is said herein that some item of data is stored in data storage 210 or a region thereof, this may mean stored in any part of any one or more memory devices making up the data storage 220.

The processing apparatus 210 and data storage 220 are operably linked. The processing apparatus and data storage are configured such that processing apparatus 210 is capable of reading data from at least a portion of data storage 220, and writing data to at least a portion of the data storage 220. The processing apparatus 210 may communicate with the data storage 220 over a local connection, e.g. a physical data bus and/or via a network such as a local area network or the Internet. In the latter case the network connections may be wired or wireless.

The data storage 220 stores first data 222 representing at least one reference video, and second data 224 representing at least one target video.

The nature of the data 222, 224 representing the reference video and the target video is not particularly limited, provided that sequences of shots in the videos may be identified.

For example, the first data 222 and/or the second data 224 may comprise video files.

Alternatively or additionally, the first data 222 and/or second data 224 may comprise descriptors of shots in videos. For example, output from a module for identifying shots in a video may be stored. It may be particularly useful to store such output for the at least one reference video. It may be desirable to compare multiple target videos to a given reference video.

The first data 222, representing at least one reference video, may comprise data representing a plurality of reference videos. In such examples, the first data 222 may be arranged in a database.

Figure 2:
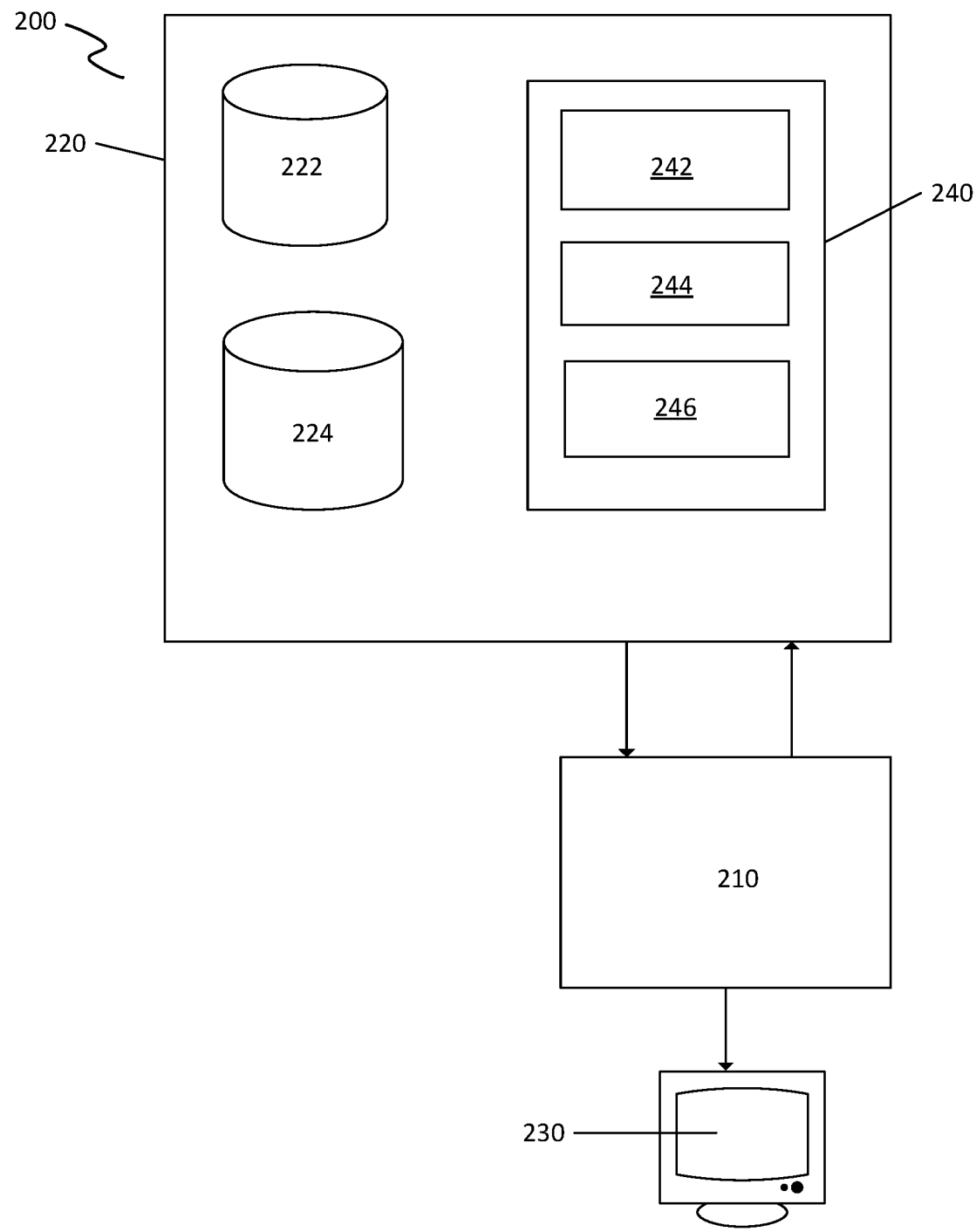
FIG. 2 is a schematic diagram of an example data processing apparatus.

Although the first data 222 and second data 224 are shown separately in FIG. 2, the Fig. is only schematic. In general these data may be stored in separate data structures or a common data structure, e.g. in a unified database. The data may be stored in the same physical storage unit or separate storage devices, e.g. on the same computer terminal or server unit, or distributed across multiple server units.

The data storage 220 further stores a computer program 240 which, when executed by the processing apparatus 210, causes the apparatus 200 to perform a method of the present disclosure.

In the present example, the computer program 240 includes a shot identification module 242 for identifying shots in a video, an evaluation module 244 for evaluating a set of conditions, and a decision module 246 for identifying whether the target video comprises an abridged version of the reference video.

The shot identification module 242 may be configured to process a video file in order to generate the shots itself, by automatically dividing the video into a plurality of shots. To do this, the shot identification module 242 comprises computer program code instructions to read a video from the data storage 220, to identify shots in the video using a shot recognition algorithm, and to provide an output indicating the shots and the order of the shots. Details of suitable shot recognition algorithms will, in themselves, be known to a person skilled in the art. This procedure may be iterative: the video may be read and processed in stages. The shot identification module 242 may generate a unique identifier for each shot.

Alternatively, the shot identification module may be configured to identify the shots in a video by reading an indication of a plurality of pre-generated shots from storage. For example the video may already have been divided into shots previously by some other automated process, or manually by a user, and an indication of the shots pre stored in memory.

Either way, the shot recognition module 242 is arranged to identify a plurality of shots into which each of the reference video and target is divided.

The output generated by the shot identification module 242 may be stored in a cache or random-access memory of the processing unit, and/or written to the data storage 220.

The evaluation module 244 comprises computer program code instructions arranged to compare shots in the target video with shots in the reference video, and to determine whether or not the shots of the target video have certain relationships to shots in the reference video.

Particularly, the evaluation module 244 is configured to evaluate conditions for determining whether the target video comprises an abridged version of the reference video. The conditions comprise at least three conditions:
 a) that the target video does not comprise all shots of the reference video;
 b) that the target video includes groups of consecutive shots also included in the reference video, wherein the groups include at least a threshold number of consecutive shots; and
 c) that all shots which are present in both the target video and the reference video are in the same order in the target video and the reference video.
Optionally there could be a further condition such as:
 d) that the target video does not include any shots which are not also included in the reference video.

The conditions include the condition a) that the target video does not comprise all shots of the reference video. A target video which comprises all of the shots of the reference video is not considered an abridged version of the reference video.

The conditions further include the condition b) that the target video includes groups of consecutive shots also included in the reference video, wherein the groups include at least a threshold number of consecutive shots.

A target video which does not comprise any shots from the reference video is not an abridged version of the reference video. The evaluation module 244 tests for the presence of groups of consecutive shots from the reference video in the target video. A human watching a video sees shots in context: an individual shot communicates very little when taken alone. Changing the order of a set of shots, or interspersing additional shots into the set, changes their meaning. By considering groups of consecutive shots, the module may be capable of providing a reliable indication of whether the target video comprises an abridged version of the reference video.

A further element of this condition is that the groups of consecutive shots include at least a threshold number of consecutive shots. Each individual group may comprise any number of shots, provided that the number of shots is equal to or greater than a threshold number. By testing for the presence of a threshold number of shots in each group of consecutive shots present in the target video, reliability of the method may be improved.

Since shots are discrete units of video, the threshold number is an integer. The threshold number may be a predetermined value e.g., from 2 to 10, optionally 2 to 5. Alternatively, the threshold number may be determined adaptively.

One example of an adaptive determination comprises selecting a threshold number based on metadata associated with the reference video. The metadata may comprise an indication of a video genre, for example. A threshold number may be assigned for each genre, using for example a look-up table. Other metadata, such as an indication of a director of the video, may be used in a similar fashion. Metadata are associated with a video when the metadata are stored in a video file, or stored with data characterizing the video, or are otherwise retrievable.

In examples where threshold numbers are assigned based on genre, threshold numbers for videos in genres where semantic content is typically fast paced, e.g. action movies, will be higher than for slower-paced genres, e.g. dramas.

Another example of an adaptive determination of a threshold number uses an average shot length in terms of playback time, and selects a threshold number such that the group of consecutive shots may be expected to have at least a predetermined playback time, e.g. at least 5 seconds.

The conditions also include the condition c) that all shots which are present in both the target video and the reference video are in the same order in the target video and the reference video. Changing the order of groups of shots may change their context, and thus, their meaning. Therefore, this test may contribute to improving the reliability of the method.

Optionally, the conditions may comprise one or more further conditions. For example, the conditions may comprise a further condition d) that the target video does not include any shots which are not also included in the reference video. This condition is useful for identifying whether a target video consists of an abridged version of the reference video.

Another example of an optional further condition is a condition that at least a minimum number of groups of consecutive shots is present. This is one further test which may be useful for assessing whether shots are shown in context. Similar to the threshold number, the minimum number of groups of consecutive shots may be a predetermined number or may be selected dynamically, e.g. based on metadata.

The evaluation module 244 may generate an output indicating which of the conditions are met by the target video. This output may be held in random-access memory and/or a cache of the processing apparatus, and/or written to the data storage 220.

The decision module 246 for identifying whether the target video comprises an abridged version of the reference video, is configured to check whether all of the conditions tested by the evaluation module 244 are met, and, if this is the case, to return a result providing an indication that the target video comprises an abridged version of the reference video; or else, to return a result providing an indication that the target video does not comprise an abridged version of the reference video. The decision module 246 may include instructions to associate the indication with the target video, and store the indication in the data storage 220.

Although the computer program 240 of this example has been described with reference to a set of modules 242, 244, 246, this is for convenience of description only. The manner in which the computer program is implemented is not particularly limited, provided that the computer program causes the method provided herein to be performed when the computer program is executed.

Although FIG. 2 depicts data processing apparatus 210 as a single unit, and data storage 220 as a single unit, distributed storage and/or computing techniques may be used. For instance, multiple processing units and/or data storage units could be networked together via a network such as a local area network (e.g. within a building) and/or a wide area network or internetwork such as the Internet. Alternatively, the processing apparatus 210 and/or data storage 220 could all be integrated into the same housing of the same computer terminal.

Figure 3:
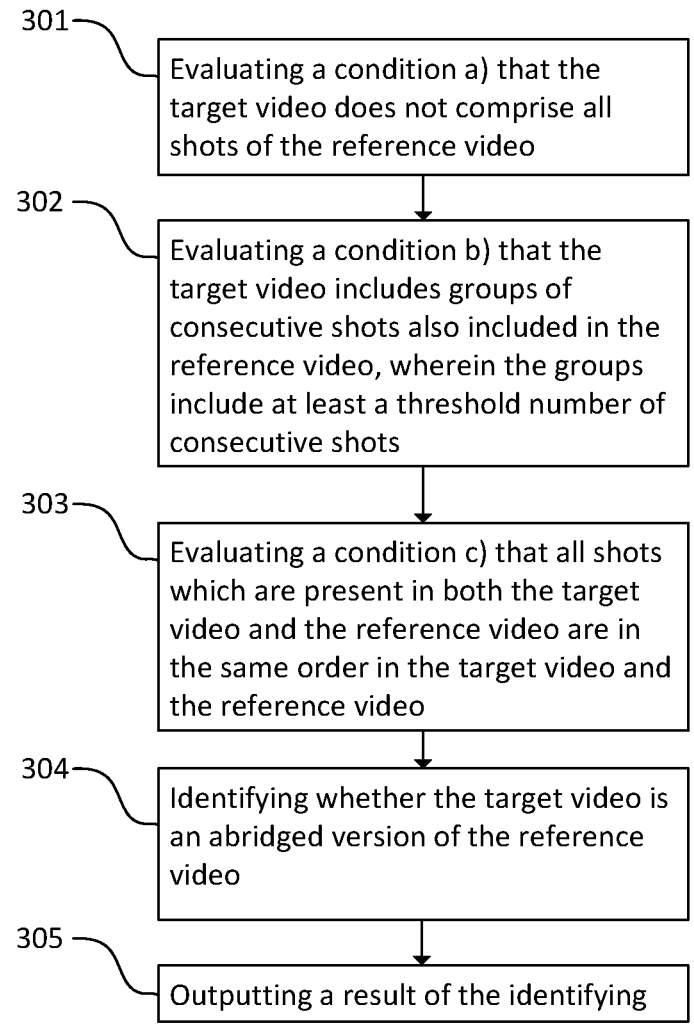
FIG. 3 is a flow chart of an example method of identifying whether a target video comprises an abridged version of a reference video.

An example computer-implemented method of identifying whether a target video comprises an abridged version of a reference video is outlined in the flow chart in FIG. 3.

At block 301, the condition a), that the condition that the target video does not comprise all shots of the reference video is evaluated. A target video that comprises all shots of the reference video is not "abridged".

At block 302, the condition b) that the target video includes groups of consecutive shots also included in the reference video, wherein the groups include at least a threshold number of consecutive shots, is evaluated. By checking for the presence of groups of consecutive shots, a more reliable determination of whether the target video would be understood by a human viewer as an abridged version of the reference video may be achieved. Individual, isolated shots lack context.

At block 303, the condition c), that all shots which are present in both the target video and the reference video are in the same order in the target video and the reference video, is evaluated. This may allow for a more reliable determination of whether the target video would be understood by a human viewer as an abridged version of the reference video. If the sequence of shots in the target video is the same as in the reference video, then the target video may be likely to be understood by a viewer as a summary of the reference video. In contrast, if shots are presented in different orders in the target video and reference video, then the target video may be unlikely to be understood as a summary of the reference video because shots may be in different contexts.

At block 304, it is identified whether the target video is an abridged version of the reference video. A target video is considered an abridged version of the reference video when all of the evaluations return true. If one or more of the conditions is not met, then the target video is not considered to be an abridged version of the reference video.

At block 305, a result of the identifying is output. The output may cause further actions to be performed on the target video. In an anti-piracy context, publication of the target video may be blocked on condition that the target video is identified as an abridged version of the reference video according to the result. Conversely, a target video which is not identified as an abridged version of the reference video may be published according to the result. In a variant, publication of a target video may also be blocked in response to failure to meet condition a), i.e., a target video which is identical to the reference video may be blocked from publication. In a video search context, the target video may be associated with a classification and/or a keyword on condition that the target video is identified as an abridged version of the reference video according to the result. A target video which is not identified as an abridged version of the reference video may, according to the result, not be associated with the classification and/or keyword.

Although the conditions a) to c) have been presented in series, this is not necessarily the case. Conditions may be evaluated in parallel, i.e., simultaneously to one another, e.g. using different processor cores of a data processing device, or as different threads executed by a single core. Conditions may be evaluated in any order. In particular, the order of blocks 302 and 303 may be reversed.

A worked example of a method of identifying whether a target video consists of an abridged version of a reference video will now be explained with reference to FIG. 4.

In an example, the present method matches a longer video (a "reference video") with a trimmed version (a "target video") based on shots.

The reference video in the following example contains more shots than the target video. The method detects the pattern in which the shots in the target video are found in the reference video.

In this example, the reference video comprises 22 shots: s1, s2, s3 . . . s22

An example valid target video, i.e. a target video which is considered an abridged version of the reference video, contains the following 9 shots:

s2, s3, s5, s6, s7, s14, s15, s18, s19

The shots are in the order stated.

The method of the present example uses the following constraints to identify the target video as an abridged version of the reference video:

i) The target video is shorter than the reference video.
 ii) Every portion of reference video which is present in the target video should include at least a threshold number of consecutive shots. In this example, the threshold number is 2.
 iii) The sequence in which the shots appear in the target video should be the same in the reference video.
 iv) Since the present example seeks to identify whether the target video consists of an abridged version of the reference video, there should not be any additional shots in the target video which are missing from the reference video.

The threshold number may vary. The threshold number is selected to allow for the identification, by the computer, of portions of video likely to be understandable by a human. The threshold number may be 2 or 3, for example.

To illustrate the effect of constraint iii), the present example method would not identify the following invalid target video as an abridged version of the reference video:
s3, s5, s7, s8, s10, s13, s15, s17, s19

This is because the portions of reference video that have been extracted are shorter than the threshold. The extracted portions are very discrete. It may not be possible for a human to understand the gist of the reference video from these extracted portions.

The above constraints can be visualised using a graph-based approach. FIG. 4 shows an illustrative graph, in the form of a scatter plot.

Indices are assigned to shots in the target video and the reference video. The x axis of the graph shown in FIG. 4 is the shot index in the reference video, and the y-axis is the shot index in the target video. For shots which appear in both the target video and the reference video, data points are plotted at co-ordinates (position of shot in reference video, position of shot in target video).

The method of determining whether the target video is an abridged version of the reference video may be visualised as determining if the shots which are common to both videos form a set of parallel lines on the graph.

Referring to the example valid target video described above, FIG. 4 shows 9 data points because the target video includes 9 shots from the reference video. Data points for shots which are consecutive in the reference have been joined.

Figure 4:
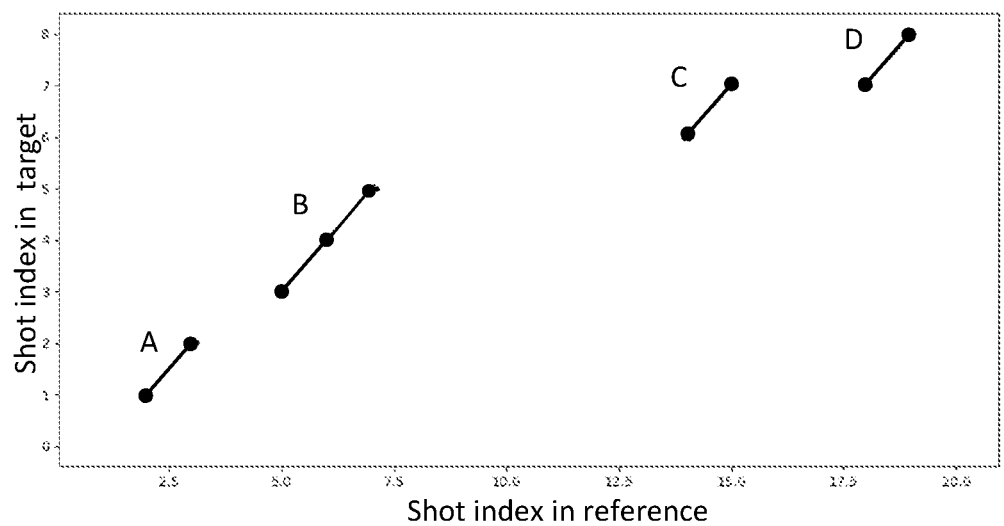
FIG. 4 is an example of a graph comparing a target video with a reference video.

The following parallel lines, each representing a group of consecutive shots, are shown in FIG. 4:
A. s2→s3
B. s5→s6→s7
C. s14→s15
D. s18→s19

An example algorithm for the graph-based approach will now be described.

Let the 9 data points in FIG. 4 be P1, P2 . . . P9. In other words, define a set of vectors P, each vector P describing a shot which appears in both the target video and the reference video. The vector P has an element describing the position of the shot in the reference video, and an element describing the position of the shot in the target video. In FIG. 4, position in the reference video is represented on the x axis, and position in the target is represented on the y axis. The terms "x and y coordinates" are used in the following description for brevity, but it is to be appreciated that in practice plotting a graph is not necessary.

In this example, each vector P is associated with a further index, i, with values assigned in sequential order. This example uses an explicitly assigned index i, for ease of explanation. In a variant, vectors P may be arranged as successive rows of a matrix, such that index i is implicit.

Step 1. Search for each shot of the target video in the reference video. If no matches are found, then the target video is not an abridged version of the reference video; else, go to step 2.

Step 2. For each matched shot identified at step 1, associate position of the shot in the target video with a position of the shot in the reference video in an appropriate way. Positions may, for example, be represented by respective indices, and pairs of positions may be associated within a vector P as described above.

This step can be visualised as plotting the matched shots on a graph, where the x axis denotes the length of the reference video and y axis that of the target video. The "x coordinate" is then the index representing the position of a given shot within the reference video, and the "y coordinate" is the index representing the position of the shot in the target video.

Step 3. For each pair of consecutive points, $P_i$ and $P_{i+1}$, (in other words, each pair of consecutive shots in the target video), determine if the x and y coordinates of $P_{i+1}$ are strictly greater than the x and y coordinates of $P_i$. $P_{i+1}$ should appear after $P_i$.

Step 4. Test for the presence of groups of consecutive shots. Starting from a point $P_i$, select a group of points from $P_i$ to $P_{i+n}$ using a rule that the x coordinate of each point in the group should be 1 greater than the x coordinate of a preceding point. By way of illustration, a group of points $P_i$, $P_{i+1}$, . . . , $P_{i+n}$, satisfies this rule if the x coordinate of $P_{i+1}$ should be 1 more than the x coordinate of $P_i$, the x coordinate of $P_{i+2}$ should 1 more than $P_{i+1}$ and so on.

Step 5. When the above step terminates after selecting n points, ($P_i$, $P_{i+1}$ . . . $P_{i+n}$), check that value of n is at least a threshold number. In this example, the threshold number is 2. This number can vary based on content type. Animations, action sequences, etc may use higher threshold numbers, as there is fast content change in these and shots are of smaller duration.

Step 6. Repeat steps 4 and 5, starting from point $P_{i+n+1}$ to form a new line, and continue for all shots of target video.

If all the above 6 steps successfully complete, then the target video is an abridged version of the reference video.

Although the above example algorithm has been described with reference to a graph and x and y co-ordinates, this is for clarity of explanation only. It is not essential to output a graph.

More generally, according to one aspect disclosed herein, there is provided a computer-implemented method of identifying whether a target video comprises an abridged version of a reference video, each of the target and reference videos being divided into a sequence of shots, wherein the method comprises:

evaluating a condition a) that the target video does not comprise all shots of the reference video;

evaluating a condition b) that the target video includes groups of consecutive shots also included in the reference video, wherein the groups include at least a threshold number of consecutive shots; and evaluating a condition c) that all shots which are present in both the target video and the reference video are in the same order in the target video and the reference video;

identifying whether the target video comprises an abridged version of the reference video, wherein the identifying comprises identifying the target video as comprising an abridged version of the reference video on condition that the condition a), the condition b) and the condition c) are met; and outputting a result of the identifying.

The set of conditions may allow for the reliable identification of abridged versions of reference videos by a computer. The method may be useful in the contexts of video production, video search, and for detecting piracy.

Examples of reference videos include, for example, a recording of a sports game, a movie, a music video, a single episode of episodic content, or a plurality of episodes of episodic content arranged in chronological order. An example of episodic content is a television series. Reference videos useful herein comprise a plurality of shots, for example, four or more shots. The vast majority of professionally-produced videos will include many shots.

The target video may be any video. For example, the target video may be a video uploaded to a video streaming or social media platform.

One application of the method is to identify videos comprising unauthorised copies of video content.

For example, the method may further comprise, on condition that the target video is identified as comprising an abridged version of the reference video according to the result, flagging the target video as a potentially unauthorised copy. The flagging may cause the video streaming or social media platform to reject the target video. The flagging may identify the target video for review by a human user.

For example, the method may further comprise identifying an origin of the target video, and, on condition that the target video is identified as comprising an abridged version of the reference video according to the result, determining whether the origin is authorised to copy the reference video.

Another application of the method is in video search. The target video may be a video to be indexed by a search engine.

The semantic content of the target and reference videos is not limited. The present methods apply a series of rules, implemented in software, to determine whether the target video comprises an abridged version of a reference video.

When comparing shots of the target video to those of the reference video, the method may comprise identifying shots of the target video which are identical to shots included in the reference video to within a predetermined tolerance. The predetermined tolerance may be selected such that overlaid text or images such as watermarks are disregarded for the purposes of the comparison. The predetermined tolerance may be selected such that flipping or rotation of the image is disregarded. The predetermined tolerance may be selected such that degradations in quality such as artifacting arising from conversion between different video encoding formats is disregarded. Applying a predetermined tolerance is particularly useful for anti-piracy applications.

The method may use, as inputs, any data which allow for identification of shots in the reference video and the target video.

For example, video files encoding the reference video and/or target video may be used as the input. In such examples, the method may further comprise, before the evaluating, identifying shots in the reference video and/or target video, as appropriate.

In another example, an identification of shots in the reference video and/or target video may be read from a data storage. Usefully, a database comprising data characterizing shots in a plurality of reference videos may be provided and used as a source of information about the reference video. Any other appropriate technique allowing for retrieval of data characterizing shots in a plurality of reference videos could be used. In such examples, the method may usefully further comprise, before the evaluating, identifying at least one shot in the target video, and selecting one or more reference videos including the at least one shot.

The target video and/or reference video may be selected by a user, or programmatically. In one particular example, the target video is selected by a user and the reference video is selected programmatically.

In examples where the conditions a), b) and c) and any optional conditions are evaluated in series, as opposed to in parallel, the evaluating may be halted if it is determined that any one of the conditions is not met.

One useful algorithm for evaluating the condition c), that shots which are present in both the target video and the reference video are in the same order in the target video and the reference video, comprises:
 i) assigning sequential values of a first index to the shots of the reference video in order of the shots of the reference video;
 ii) assigning sequential values of a second index to the shots of the target video in order of the shots of the reference video;
 iii) identifying a shot of the target video which is included in the reference video;
 iv) assigning a vector to the identified shot, the vector having a first element representing the value of the first index of the shot, and a second element representing the value of the second index of the shot;
 v) iterating step iv) to identify a plurality of vectors, and associating the vectors with sequential values of an identifier;
 vi) for each vector of the plurality of vectors, evaluating the condition that as the value of the identifier is incremented by 1, the value of the first element always increases.

In one example, associating the vectors with sequential values of an identifier may comprise assigning sequential values of a third index to the vectors.

In another example, associating the vectors with sequential identifiers comprises arranging the vectors in a matrix, such that each vector represents a row of the matrix. In this arrangement, the sequential identifiers are row numbers of the matrix.

This algorithm is analogous to a graph-based method. Steps i) and ii) of the above algorithm may be thought of as numbering each shot of the target and reference videos in order. Step iii) may be thought of as identifying a shot which appears in both the target and reference video. Step iv) may be thought of as plotting a point on a graph, having the (x,y) co-ordinates (position of the shot in target video, position of the shot in reference video). Step v) is analogous to plotting such coordinates for each of the shots which appear in both the target and reference videos. Step vi) is analogous to inspecting the graph to see if all points on the graph move up and to the right.

One useful algorithm for identifying groups of consecutive shots builds on the example algorithm for evaluating the condition c), and comprises identifying groups of consecutive shots by:
 vii) selecting a starting vector;
 viii) selecting a comparative vector, the comparative vector having a value of the identifier which is 1 greater than the value of the identifier of the starting vector;
 ix) evaluating the condition that the first element of the comparative vector has a value which is exactly 1 greater than the value of the first element of the starting vector; wherein the starting vector and the comparative vector describe members of a group of consecutive shots when condition ix is met;
 x) on condition that the evaluating at ix) determines that the condition is met, iterating steps vii to ix until the condition is no longer met to identify the group of consecutive shots; and
 xi) counting the number of shots in the group of consecutive shots.

This method is akin to looking at the above-described graph, and checking to see if the graph includes a set of parallel lines, each line having a positive gradient, indicating that shots are in the same order in the target video and the reference video, the magnitude of the gradient being 1 since shots within a group are consecutive.

The above technique for identifying groups of consecutive shots may be applied iteratively, to identifying multiple groups of consecutive shots. In such an example, after step x), iterating steps vii) to ix) until the condition is no longer met to identify the group of consecutive shots, has been completed, the comparative video from the last iteration of step ix) becomes the starting video for a new iteration of steps vii) to x) to identify a further group of consecutive shots. This process may be continued until all groups of consecutive shots are identified.

When using the example algorithm, evaluating whether the groups of include at least a threshold number of consecutive shots comprises evaluating whether the count obtained at step xi), counting the number of shots in the group of consecutive shots, is equal to or greater than the threshold number.

It is to be appreciated that the methods provided herein do not necessarily plot a graph for display to a user, although this may be performed as an optional step.

Although example algorithms have been described, conditions may be evaluated using any appropriate technique. In particular, describing pairs of shots using indices arranged in vectors is optional.

Conditions may be evaluated in series or in parallel. In examples where the conditions are evaluated in series, conditions may be evaluated in any order. Condition a) is typically evaluated first, but the order in which conditions b), c), and any optional additional conditions are evaluated is not particularly limited and may be selected as desired.

The reference video may be associated with metadata, the metadata comprising a classification and/or a keyword. There are various potential uses for such metadata in the context of the present methods.

For example, the method may include selecting the threshold number based on the metadata. For example, the metadata may comprise the classification, and the classification may comprise an indication of a genre of the reference video. The frequency of cuts between shots may vary between different genres of videos. Determining the threshold based on the video genre may allow for identification of groups of consecutive shots of a meaningful length.

Other types of metadata may be used as a basis for selecting the threshold number. For example, the metadata may comprise an indication of the director or producer of a video. Different directors and producers may favour different frequencies of cuts. Threshold numbers may be assigned in a look-up table, for example.

Another possible use of metadata in the context of the present methods is that the method may further comprise, on condition that the target video is identified as an abridged version of the reference video according to the result, associating the target video with the classification and/or the keyword. This may be useful if the target video is to be accessed later via a search engine. For example, a user who searches for a title of a reference video may receive a list of results which includes one or more abridged versions of the reference video. Such abridged versions may otherwise be difficult to identify, if appropriate keywords are not applied when the abridged version is first created or uploaded to a search platform.

Usefully, the associating may comprise indexing the video for access via a search engine. The keywords and/or classification may alternatively be stored, e.g. for later indexing by another entity separate from the entity executing the present method.

Another technique for selecting the threshold number comprises identifying an average length of shots of the reference video; and selecting the threshold number based on the average length. For example, the threshold number may be selected such that groups of consecutive shots to be identified have an expected minimum playback length of at least 2 seconds, or at least 5 seconds, or in the range 2 to 15 seconds.

Still another alternative is to define a predetermined threshold number. The predetermined threshold number has a value of at least 2, e.g., in the range 2 to 5. A predetermined threshold number of 2 or 3 may be suitable for various types of video content.

The method may further comprise, on condition that the target video is identified as an abridged version of the reference video according to the result, blocking the target video from being published on at least one online platform. This may be useful in contexts where the identification and blocking of unauthorised videos comprising portions of a reference video is desired.

The condition a), the condition b), and the condition c) as described above have been found to be useful for identifying abridged versions of reference videos. Other conditions may additionally be applied.

For example, the condition b) is that the target video includes groups of consecutive shots also included in the reference video, wherein the groups include at least a threshold number of consecutive shots. An additional condition b1), that at least a predetermined number of groups of consecutive shots are present, may also be applied. For example, the predetermined number may be 3 or more, e.g. in the range 3 to 5.

One example of an additional condition is the condition d), that the target video does not include shots which are not also included in the reference video. When this condition is applied, the method identifies videos which consist of an abridged version of the reference video, i.e. which do not include any additional content. This condition may be useful in anti-piracy contexts, for example, for identifying an entire piece of content which has been edited to remove credits and introductory sequences; or for distinguishing videos containing a series of clips from a reference video with added commentary or criticism from simple edited copies of the reference video.

As one alternative to applying condition d), the method may further comprise, on condition that the target video is identified as an abridged version of the reference video according to the result, evaluating a supplementary condition that the target video includes one or more shots not contained in the reference video; and on condition that the supplementary condition is met, comparing a total length of the one or more shots not contained in the reference video with a total length of the groups of consecutive shots and outputting a comparison of the total length of the of the one or more shots not contained in the reference video relative to the total length of the groups of consecutive shots. By comparing the relative amount of content copied from the reference video with content added to the target video, an assessment of whether the target video is likely to contain content such as commentary or criticism may be made. This may allow for target videos which are likely to represent "fair use" to be distinguished from target videos which are likely to be unauthorised.

In examples where the comparison is performed, the method may further comprise: on condition that the one or more shots not contained in the reference video represent less than a predetermined fraction of the target video according to the comparison, blocking the target video from being published on at least one online platform; or on condition that the one or more shots not contained in the reference video represent at least a predetermined fraction of the target video according to the comparison, allowing the target video to be published on the at least one online platform. The method may therefore allow filtering of videos, allowing the publication of videos which are likely to represent fair use while blocking videos which are likely to be unauthorised.

The method may further comprise generating a graph comparing the target video and the reference video. In such examples, each shot of the reference video is assigned an index representing a position of the shot within the reference video. Likewise, each shot of the target video is assigned an index. A scatter plot is generated, with data points at co-ordinates (position of shot in reference video, position of shot in target video). This allows for visualisation of whether the target video meets the conditions.

The method may further comprise performing one or more further actions based on the result. For example, a target video which is identified as comprising an abridged version of the reference video may be flagged for consideration by a user. A graph of the type described above may be generated in response to identifying that the target video is an abridged version of the reference video. A target video which is identified as not comprising an abridged version of the reference video may be subjected to further processing, e.g. indexing in a search engine, or publication on the Internet.

Another aspect provides a data processing apparatus comprising means for carrying out the method of the present disclosure. The nature of the data processing apparatus is not particularly limited, provided that it is capable of executing the method as provided herein. Illustrative examples of data processing apparatus are described herein below.

A further aspect provides a computer readable storage medium comprising instructions which, when executed by a computer, cause the computer to carry out the method of the present disclosure. The medium is typically non-transitory. The nature of the storage medium is not particularly limited. Examples of computer readable storage media include hard disk drives, solid state drives, flash memory, DVDs, CDs, magnetic tapes, and floppy disks, etc.

Still another aspect provides a computer program comprising instructions which, when the computer program is executed by a computer, cause the computer to carry out the method of the present disclosure.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of identifying whether a target video comprises an abridged version of a reference video, each of the target and reference videos being divided into a sequence of shots, wherein the method comprises:
evaluating a first condition associated with the target video not comprising all shots of the reference video;
evaluating a second condition associated with the target video including groups of consecutive shots also included in the reference video, wherein the groups include at least a threshold number of consecutive shots;
evaluating a third condition associated with all shots being present in both the target video and the reference video in a same order in the target video and the reference video;
identifying whether the target video comprises an abridged version of the reference video, wherein the identifying comprises identifying the target video as comprising an abridged version of the reference video on condition that the first condition, the second condition, and the third condition are met; and
outputting a result of the identifying.

2. The computer-implemented method according to claim 1, wherein evaluating the third condition comprises:
assigning sequential values of a first index to the shots of the reference video in order of the shots of the reference video;
assigning sequential values of a second index to the shots of the target video in order of the shots of the target video;
identifying a shot of the target video which is included in the reference video;
assigning a vector to the identified shot, the vector having a first element representing the value of the first index of the shot, and a second element representing the value of the second index of the shot;
iterating a step of assigning the vector to the identified shot to identify a plurality of vectors, and associating the vectors with sequential values of an identifier;
for each vector of the plurality of vectors, evaluating the condition that as the value of the identifier is incremented by one, the value of the first element always increases.

3. The computer-implemented method according to claim 2, wherein evaluating the second condition comprises identifying groups of consecutive shots by:
selecting a starting vector;
selecting a comparative vector, the comparative vector having a value of the identifier which is one greater than the value of the identifier of the starting vector;
evaluating a fourth condition that the first element of the comparative vector has a value which is exactly one greater than the value of the first element of the starting vector; wherein the starting vector and the comparative vector describe members of a group of consecutive shots when the fourth condition is met;
on condition that the fourth condition is met, iterating steps of selecting the starting vector, selecting the comparative vector, and evaluating the fourth condition until the fourth condition is no longer met to identify the group of consecutive shots; and
counting the number of shots in the group of consecutive shots.

4. The computer-implemented method according to claim 3, further comprising plotting the values of the first and second indices of the shots on separate axes of a graph and displaying the graph to a user.

5. The computer-implemented method according to claim 1, wherein the reference video is associated with metadata, the metadata comprising one or more of a classification or a keyword.

6. The computer-implemented method according to claim 5, wherein the method further comprises selecting the threshold number based on the metadata.

7. The computer-implemented method according to claim 6, wherein the metadata comprise the classification, and wherein the classification comprises an indication of a genre of the reference video.

8. The computer-implemented method according to claim 5, further comprising, on condition that the target video is identified as an abridged version of the reference video according to the result, associating the target video with one or more of a classification or a keyword.

9. The computer-implemented method according to claim 8, wherein the associating comprises indexing the video for access via a search engine.

10. The computer-implemented method according to claim 1, further comprising, on condition that the target video is identified as an abridged version of the reference video according to the result, blocking the target video from being published on at least one online platform.

11. The computer-implemented method according to claim 1, further comprising evaluating a fourth condition that the target video does not include any shots which are not also included in the reference video; and
wherein the identifying comprises identifying the target video as comprising an abridged version of the reference video on condition that the first condition, second condition, third condition, and fourth condition are met.

12. The computer-implemented method according to claim 1, further comprising:
on condition that the target video is identified as an abridged version of the reference video according to the result, evaluating a supplementary condition that the target video includes one or more shots not contained in the reference video; and
on condition that the supplementary condition is met, comparing a total length of the one or more shots not contained in the reference video with a total length of the groups of consecutive shots and outputting a comparison of the total length of the of the one or more shots not contained in the reference video relative to the total length of the groups of consecutive shots.

13. The computer-implemented method according to claim 12, further comprising:
on condition that the one or more shots not contained in the reference video represent less than a predetermined fraction of the target video according to the comparison, blocking the target video from being published on at least one online platform; or
on condition that the one or more shots not contained in the reference video represent at least a predetermined fraction of the target video according to the comparison, allowing the target video to be published on the at least one online platform.

14. A system, comprising:
processing apparatus comprising one or more processing units, and
memory comprising one or more memory units;
instructions on the memory being executable by the one or more processing units to:
evaluate a first condition associated with de-a target video not comprising all shots of the reference video;
evaluate a second condition associated with the target video including groups of consecutive shots also included in the reference video, wherein the groups include at least a threshold number of consecutive shots;
evaluate a third condition associated with all shots being present in both the target video and the reference video in a same order in the target video and the reference video;
identify whether the target video comprises an abridged version of the reference video, wherein the identifying comprises identifying the target video as comprising an abridged version of the reference video on condition that the first condition, the second condition, and the third condition are met; and
output a result of the identifying.

15. A computer program embodied on computer-readable storage and comprising instructions which, when the computer program is run by a computer, cause the computer to:
evaluate a first condition associated with a target video not comprising all shots of the reference video;
evaluate a second condition associated with the target video including groups of consecutive shots also included in the reference video, wherein the groups include at least a threshold number of consecutive shots;
evaluate a third condition associated with all shots being present in both the target video and the reference video in a same order in the target video and the reference video;
identify whether the target video comprises an abridged version of the reference video, wherein the identifying comprises identifying the target video as comprising an abridged version of the reference video on condition that the first condition, the second condition, and the third condition are met; and
output a result of the identifying.

16. The system of claim 14, wherein evaluating the third condition comprises:
assigning sequential values of a first index to the shots of the reference video in order of the shots of the reference video;
assigning sequential values of a second index to the shots of the target video in order of the shots of the target video;
identifying a shot of the target video which is included in the reference video;
assigning a vector to the identified shot, the vector having a first element representing the value of the first index of the shot, and a second element representing the value of the second index of the shot;
iterating a step of assigning the vector to the identified shot to identify a plurality of vectors, and associating the vectors with sequential values of an identifier; and
for each vector of the plurality of vectors, evaluating the condition that as the value of the identifier is incremented by one, the value of the first element always increases.

17. The system of claim 16, wherein evaluating the second condition comprises identifying groups of consecutive shots by:
selecting a starting vector;
selecting a comparative vector, the comparative vector having a value of the identifier which is one greater than the value of the identifier of the starting vector;
evaluating a fourth condition that the first element of the comparative vector has a value which is exactly one greater than the value of the first element of the starting vector; wherein the starting vector and the comparative vector describe members of a group of consecutive shots when the fourth condition is met;

on condition that the fourth condition is met, iterating steps of selecting the starting vector, selecting the comparative vector, and evaluating the fourth condition until the fourth condition is no longer met to identify the group of consecutive shots; and counting the number of shots in the group of consecutive shots.

18. The system of claim 14, further comprising instructions being executable by the one or more processing units to, on condition that the target video is identified as an abridged version of the reference video according to the result, blocking the target video from being published on at least one online platform.

19. The computer program of claim 15, wherein evaluating the third condition comprises:

assigning sequential values of a first index to the shots of the reference video in order of the shots of the reference video;

assigning sequential values of a second index to the shots of the target video in order of the shots of the target video;

identifying a shot of the target video which is included in the reference video;

assigning a vector to the identified shot, the vector having a first element representing the value of the first index of the shot, and a second element representing the value of the second index of the shot;

iterating a step of assigning the vector to the identified shot to identify a plurality of vectors, and associating the vectors with sequential values of an identifier; and for each vector of the plurality of vectors, evaluating the condition that as the value of the identifier is incremented by one, the value of the first element always increases.

20. The computer program of claim 19, wherein evaluating the second condition comprises identifying groups of consecutive shots by:

selecting a starting vector;

selecting a comparative vector, the comparative vector having a value of the identifier which is one greater than the value of the identifier of the starting vector;

evaluating a fourth condition that the first element of the comparative vector has a value which is exactly one greater than the value of the first element of the starting vector; wherein the starting vector and the comparative vector describe members of a group of consecutive shots when the fourth condition is met;

on condition that the fourth condition is met, iterating steps of selecting the starting vector, selecting the comparative vector, and evaluating the fourth condition until the fourth condition is no longer met to identify the group of consecutive shots; and counting the number of shots in the group of consecutive shots.

\* \* \* \* \*